United States Patent
Chen et al.

(10) Patent No.: US 9,325,164 B2
(45) Date of Patent: Apr. 26, 2016

(54) ELECTROSTATIC DISCHARGE (ESD) PROTECTION DEVICE FOR AN OUTPUT BUFFER

(71) Applicant: UNITED MICROELECTRONICS CORP., Hsin-Chu (TW)

(72) Inventors: Lu-An Chen, Hsinchu County (TW); Tien-Hao Tang, Hsinchu (TW)

(73) Assignee: UNITED MICROELECTRONICS CORP., Science-Based Industrial Park, Hsin-Chu (TW)

( * ) Notice: Subject to any disclaimer, the term of this patent is extended or adjusted under 35 U.S.C. 154(b) by 24 days.

(21) Appl. No.: 14/492,089

(22) Filed: Sep. 22, 2014

(65) Prior Publication Data

US 2016/0087423 A1    Mar. 24, 2016

(51) Int. Cl.
*H02H 1/00*    (2006.01)
*H02H 3/22*    (2006.01)
*H02H 9/02*    (2006.01)
*H02H 3/20*    (2006.01)
*H02H 3/02*    (2006.01)

(52) U.S. Cl.
CPC . *H02H 3/20* (2013.01); *H02H 1/00* (2013.01); *H02H 3/02* (2013.01)

(58) Field of Classification Search
CPC .......... H02H 9/04; H02H 9/041; H02H 9/046
USPC ........................................................... 361/56
See application file for complete search history.

(56) References Cited

U.S. PATENT DOCUMENTS

| 7,379,283 | B1 | 5/2008 | Farrenkopf | |
|---|---|---|---|---|
| 8,247,839 | B2 | 8/2012 | Van Wijmeersch | |
| 9,054,520 | B2 * | 6/2015 | Worley | .................. H02H 9/046 |
| 2009/0166671 | A1 * | 7/2009 | Hwang | ............... H01L 27/0262 257/137 |

* cited by examiner

*Primary Examiner* — Dharti Patel
(74) *Attorney, Agent, or Firm* — Winston Hsu; Scott Margo

(57) ABSTRACT

An electrostatic discharge (ESD) protection device is disclosed. The ESD protection device comprises a trigger circuit, a switch, and an output buffer. When an ESD event occurs, the trigger circuit turns on the switch. One part of the current of the electrostatic discharge (ESD) event may be routed to a ground through the switch from the output buffer coupled to the output pad.

27 Claims, 7 Drawing Sheets

ELECTROSTATIC DISCHARGE (ESD) PROTECTION DEVICE FOR AN OUTPUT BUFFER

BACKGROUND OF THE INVENTION

1. Field of the Invention

The present invention presents an electrostatic discharge (ESD) protection device for an output driver circuit, more particularly, an electrostatic discharge (ESD) protection for protection of an output buffer of an output driver circuit.

2. Description of the Prior Art

FIG. 1 illustrates a circuit of an electrostatic discharge (ESD) protection device 100 according to a prior art. The ESD protection device 100 is coupled to an internal circuit 101. The ESD protection device 100 has an output buffer T1 and an electrostatic discharge (ESD) cell T2 coupled to an output pad PAD1. When an electrostatic discharge (ESD) event occurs in the output pad PAD1, majority of current of the ESD event is driven to the ground through the ESD cell T2 and some of the current from the ESD event will go through the output buffer T1 since the output buffer T1 is partially turned on.

The amount of current going through the output buffer T1 and the ESD cell T2 is divided using percentage. For example, 80% of the current of the ESD event goes through the ESD cell T2 and 20% of the current of the ESD event goes through the output buffer T1. As the current of the ESD event gets higher, the current that goes through the output buffer T1 also gets higher. Therefore, the output buffer T1 is not completely protected by using the ESD cell T2.

SUMMARY OF THE INVENTION

A first embodiment of the present invention presents an electrostatic discharge (ESD) protection device. The electrostatic discharge (ESD) protection device comprises a trigger circuit having a first terminal coupled to an output pad and a second terminal; a switch having a first terminal, a control terminal coupled to the second terminal of the trigger circuit, and a second terminal coupled to a ground; and an output buffer having a first terminal coupled to the output pad, a control terminal coupled to the first terminal of the switch, and a second terminal coupled to the ground.

A second embodiment of the present invention presents an electrostatic discharge (ESD) protection device. The electrostatic discharge (ESD) protection device comprises a trigger circuit having a first terminal coupled to a power supply, a second terminal coupled to a ground and an output terminal; a switch having a first terminal, a control terminal coupled to the output terminal of the trigger circuit, and a second terminal coupled to the ground; and an output buffer having a first terminal coupled to an output pad, a control terminal coupled to the first terminal of the switch, and a second terminal coupled to the ground.

A third embodiment of the present invention presents a method of operation of an electrostatic discharge (ESD) protection device. The method of operation of the electrostatic discharge (ESD) protection device comprises a trigger circuit generating a triggering voltage according to current of an electrostatic discharge (ESD) event received from an output pad, the triggering voltage turning on a switch coupled to the trigger circuit, and routing one part of the current of the electrostatic discharge (ESD) event to a ground through the switch from the output buffer coupled to the output pad.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
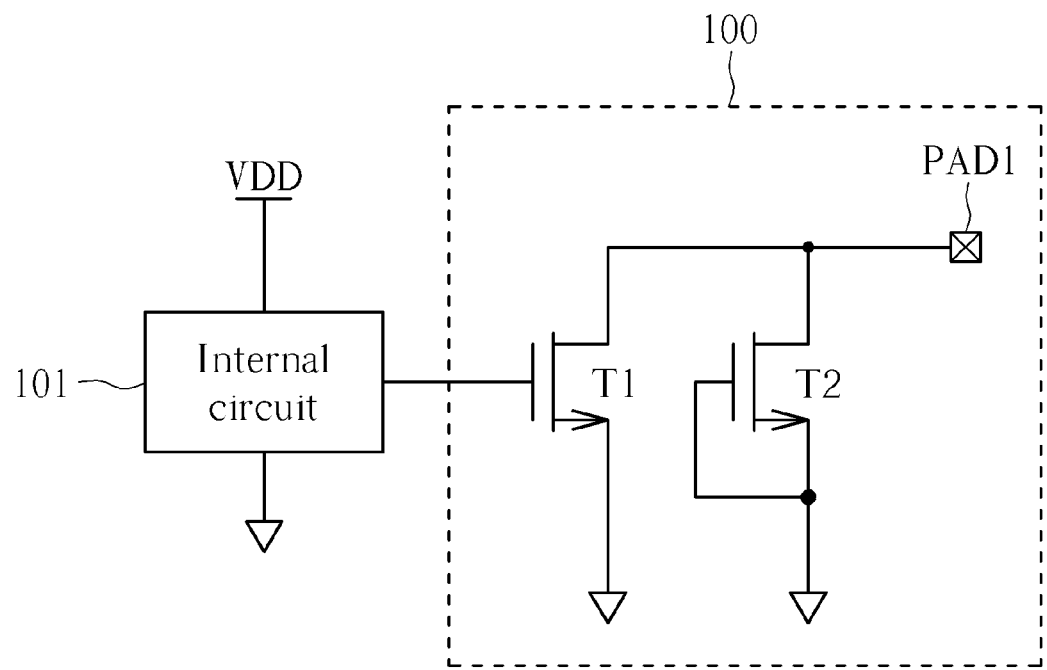
FIG. 1 illustrates a circuit of an electrostatic discharge (ESD) protection device according to a prior art.
Figure 2:
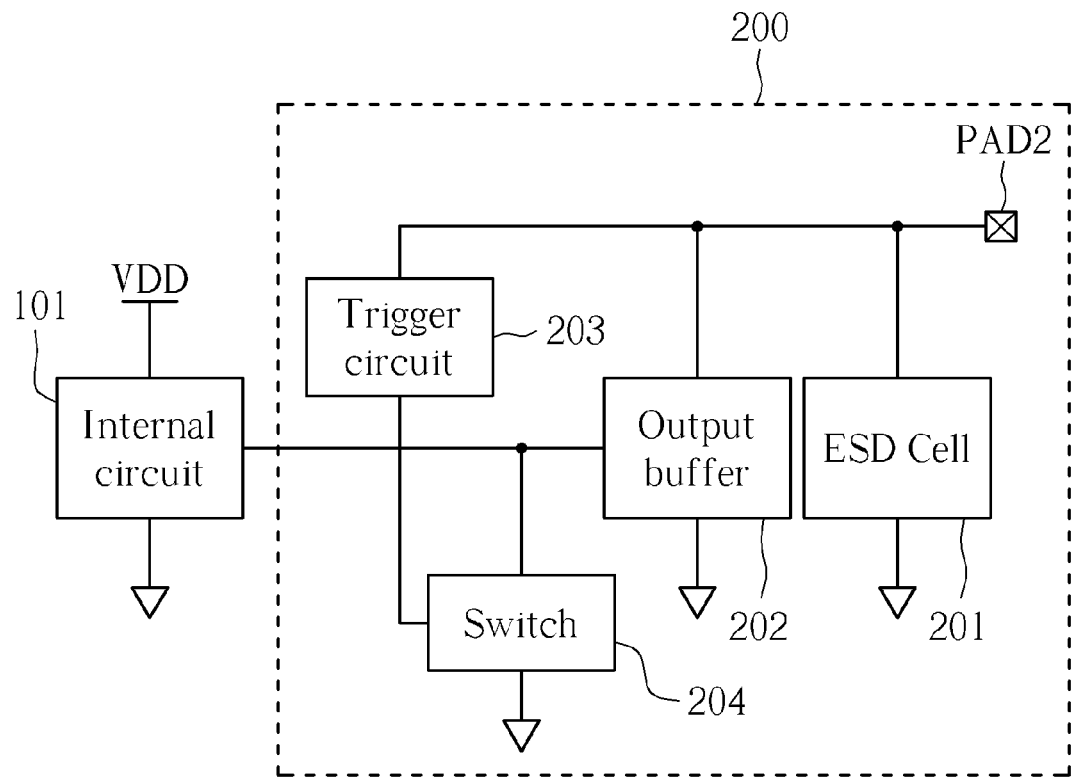
FIG. 2 illustrates a block diagram of an electrostatic discharge (ESD) protection device according to a first embodiment of the present invention.

FIG. 2 illustrates a block diagram of an electrostatic discharge (ESD) protection device 200 according to a first embodiment of the present invention. The ESD protection device 200 may be coupled to an internal circuit 101 of a semiconductor device. The internal circuit 101 may be coupled to a power supply VDD and a ground. The ESD protection device 200 comprises an output buffer 202, a trigger circuit 203, and a switch 204. The trigger circuit 203 may have a first terminal coupled to an output pad PAD2 and a second terminal. The switch 204 may have a first terminal, a control terminal coupled to the second terminal of the trigger circuit 203, and a second terminal coupled to a ground. The output buffer 202 may have a first terminal coupled to the output pad PAD2, a control terminal coupled to the first terminal of the switch 204, and a second terminal coupled to the ground. The ESD protection device 200 may further comprise an ESD cell 201. The ESD cell 201 may have a first terminal coupled to the output pad PAD2 and a second terminal coupled to the ground.

Figure 3:
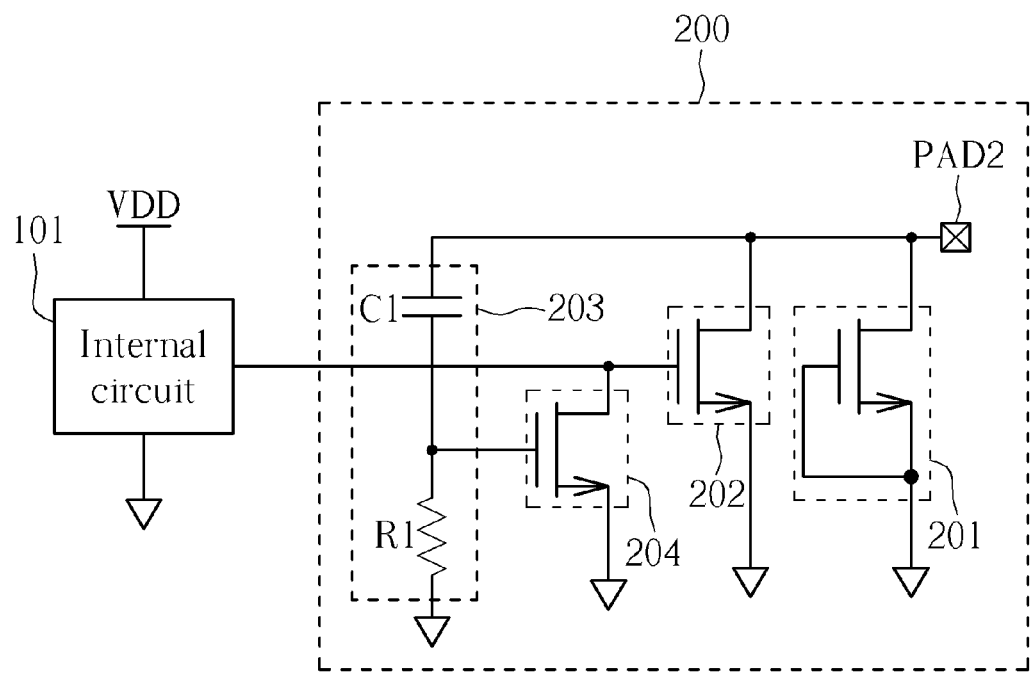
FIGS. 3 to 5 illustrate circuit diagrams of the ESD protection device in FIG. 2.
Figure 4:
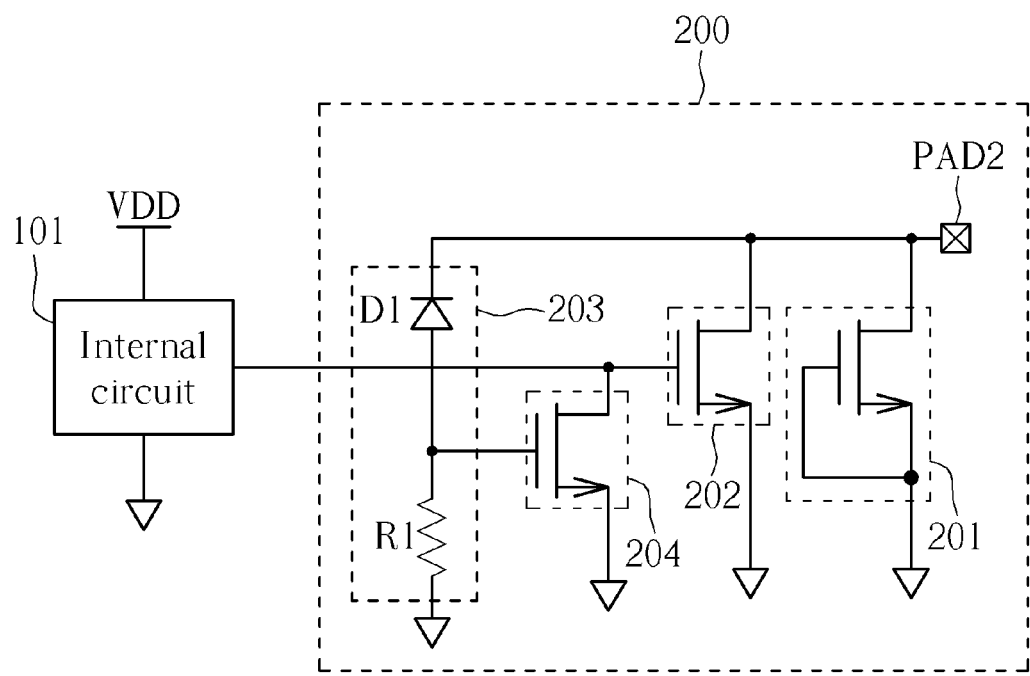
Figure 5:
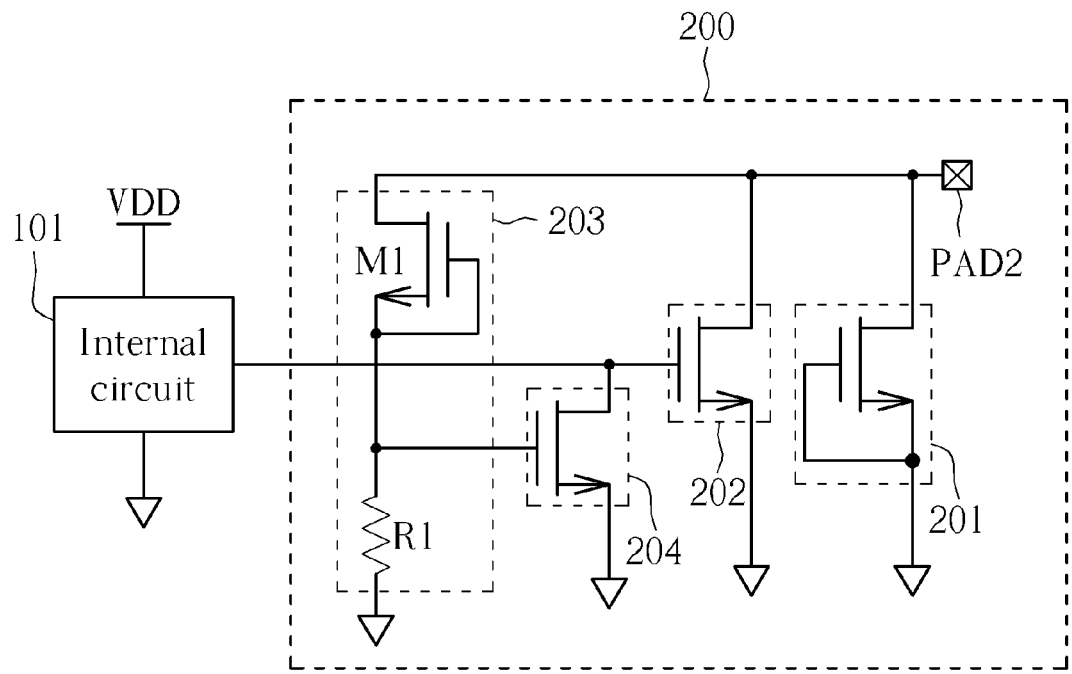

The ESD cell 201 may be a bipolar junction transistor (BJT), a silicon controlled rectifier (SCR), or a field effect transistor (FET). The switch 204 may be a metal-oxide-semiconductor field effect transistor (MOSFET). The output buffer 202 may be a laterally diffused metal-oxide-semiconductor field effect transistor (LDMOS). FIGS. 3 to 5 illustrate circuit diagrams of the ESD protection device 200 in FIG. 2. The embodiments of the ESD protection device 200 shown in FIGS. 3 to 5 may include a field effect transistor (FET) as the ESD cell 201, a metal-oxide-semiconductor field effect transistor (MOSFET) as the switch 204, and a laterally diffused metal-oxide-semiconductor field effect transistor (LDMOS) as the output buffer 202. In FIG. 3, the trigger circuit 203 may comprise a capacitor C1 and a resistor R1. The capacitor C1 may have a first terminal coupled to the output pad PAD2 and a second terminal coupled to the control terminal of the switch 204. The resistor R1 may have a first terminal coupled to the second terminal of the capacitor C1 and a second terminal coupled to the ground. In FIG. 4, the trigger circuit 203 may comprise a diode D1 and the resistor R1. The diode D1 may have a first terminal coupled to the output pad PAD2 and a second terminal coupled to the control terminal of the switch 204. The resistor R1 may have a first terminal coupled to the second terminal of the diode D1 and a second terminal coupled to the ground. In FIG. 5, the trigger circuit 203 may comprise a metal-oxide-semiconductor (MOS) diode M1 and the resistor R1. The MOS diode M1 may have a first terminal coupled to the output pad PAD2 and a second terminal coupled to the control terminal of the switch 204. The resistor R1 may have a first terminal coupled to the second terminal of the MOS diode M1 and a second terminal coupled to the ground.

Figure 6:
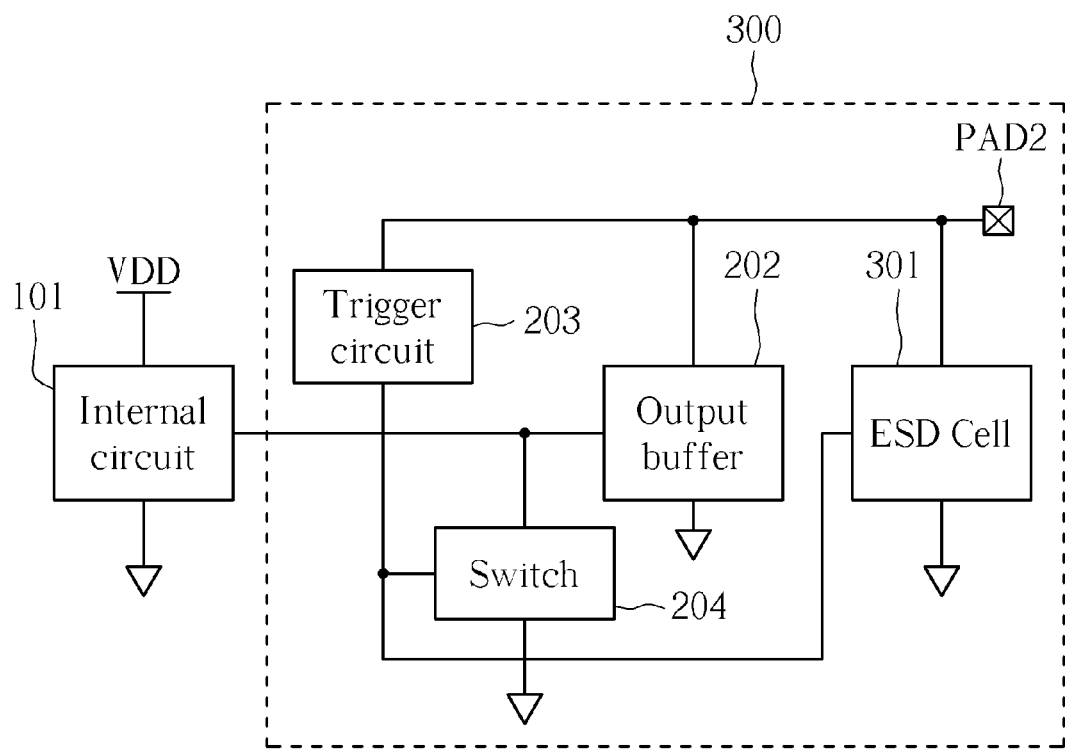
FIG. 6 illustrates a block diagram of an electrostatic discharge (ESD) protection device according to a second embodiment of the present invention.

FIG. 6 illustrates a block diagram of an electrostatic discharge (ESD) protection device 300 according to a second embodiment of the present invention. The ESD protection device 300 may be coupled to the internal circuit 101. The protection device 300 comprises the output buffer 202, the trigger circuit 203, and the switch 204. The trigger circuit 203 may have a first terminal coupled to an output pad PAD2 and a second terminal. The switch 204 may have a first terminal, a control terminal coupled to the second terminal of the trigger circuit 203, and a second terminal coupled to a ground. The output buffer 202 may have a first terminal coupled to the output pad PAD2, a control terminal coupled to the first terminal of the switch 204, and a second terminal coupled to the ground. The ESD protection device 300 may further comprise an ESD cell 301. The ESD cell 301 may have a first terminal coupled to the output pad PAD2, a control terminal coupled to the second terminal of the trigger circuit 203, and a second terminal coupled to the ground.

Figure 7:
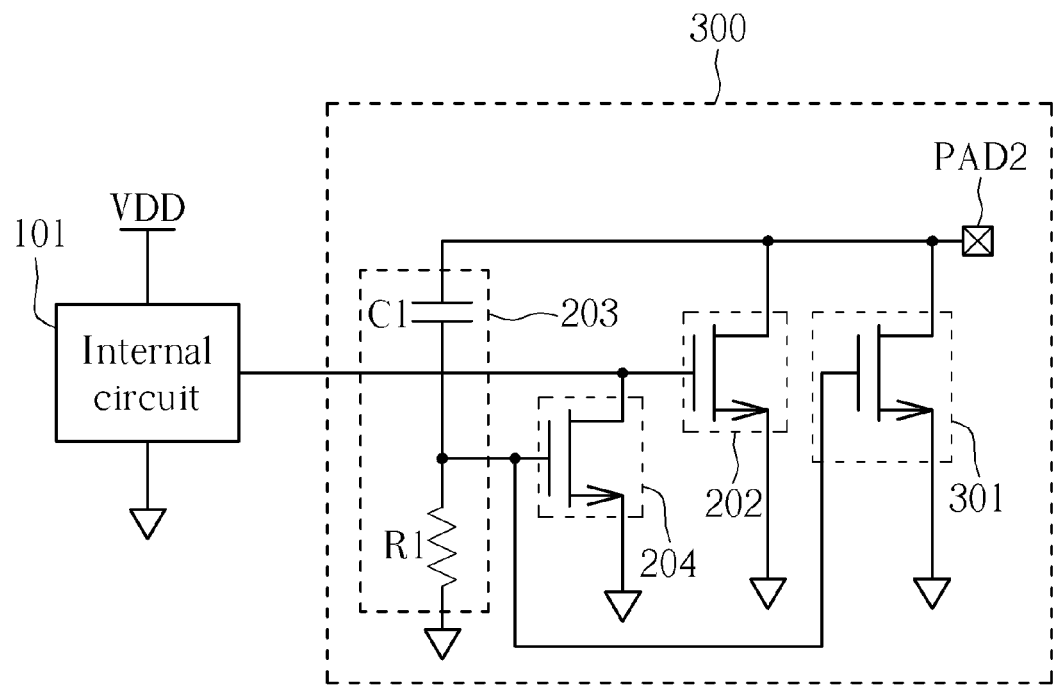
FIGS. 7 to 9 illustrate circuit diagrams of the ESD protection device in FIG. 6.
Figure 8:
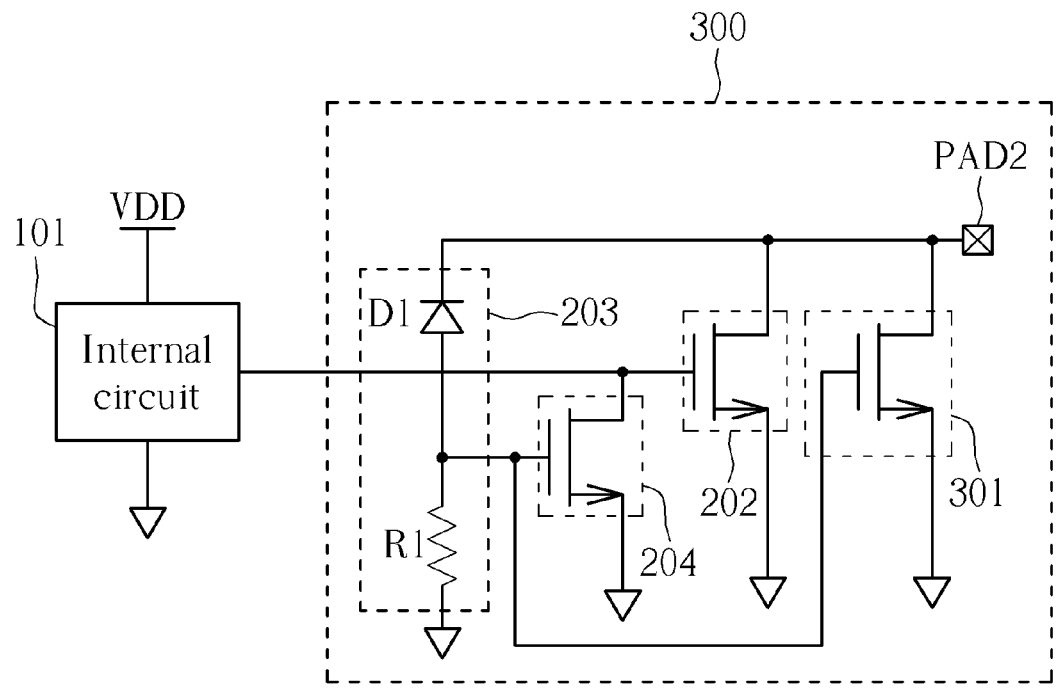
Figure 9:
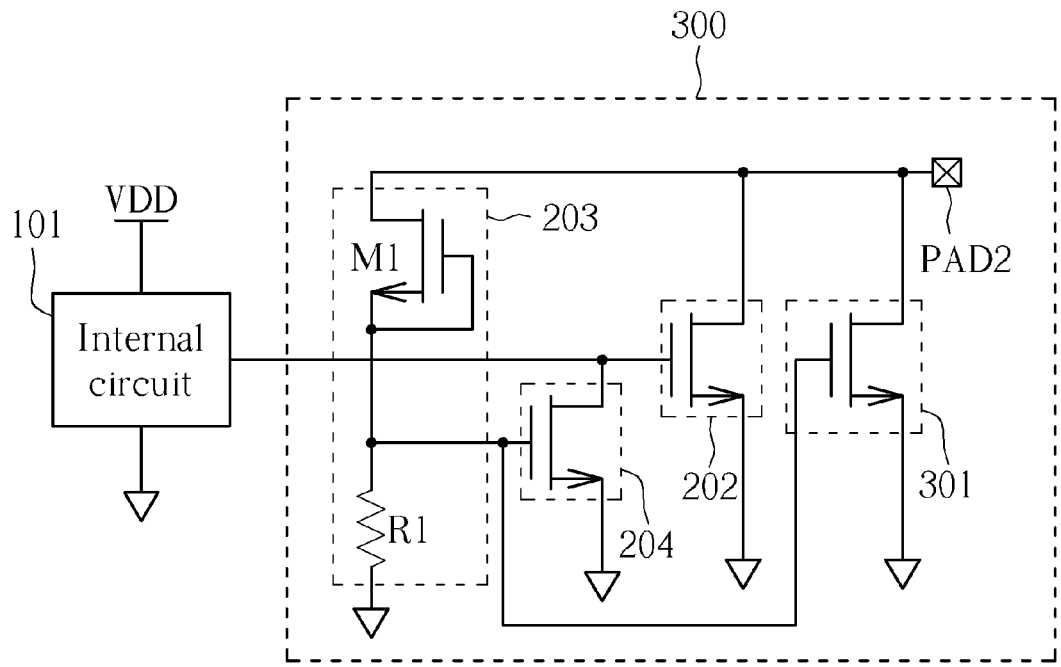

The ESD cell 301 may be a bipolar junction transistor (BJT), a silicon controlled rectifier (SCR), or a field effect transistor (FET). The switch 204 may be a metal-oxide-semiconductor field effect transistor (MOSFET). The output buffer 202 may be a laterally diffused metal-oxide-semiconductor field effect transistor (LDMOS). FIGS. 7 to 9 illustrates circuit diagrams of the ESD protection device 300 in FIG. 6. The embodiments of the ESD protection device 300 shown in FIGS. 7 to 9 may include a field effect transistor (FET) as the ESD cell 301, a metal-oxide-semiconductor field effect transistor (MOSFET) as the switch 204, and a laterally diffused metal-oxide-semiconductor field effect transistor (LDMOS) as the output buffer 202. In FIG. 7, the trigger circuit 203 may comprise a capacitor C1 and a resistor R1. The capacitor C1 may have a first terminal coupled to the output pad PAD2 and a second terminal coupled to the control terminal of the switch 204. The resistor R1 may have a first terminal coupled to the second terminal of the capacitor C1 and a second terminal coupled to the ground. In FIG. 8, the trigger circuit 203 may comprise a diode D1 and the resistor R1. The diode D1 may have a first terminal coupled to the output pad PAD2 and a second terminal coupled to the control terminal of the switch 204. The resistor R1 may have a first terminal coupled to the second terminal of the diode D1 and a second terminal coupled to the ground. In FIG. 9, the trigger circuit 203 may comprise a metal-oxide-semiconductor (MOS) diode M1 and the resistor R1. The MOS diode M1 may have a first terminal coupled to the output pad PAD2 and a second terminal coupled to the control terminal of the switch 204. The resistor R1 may have a first terminal coupled to the second terminal of the MOS diode M1 and a second terminal coupled to the ground.

Figure 10:
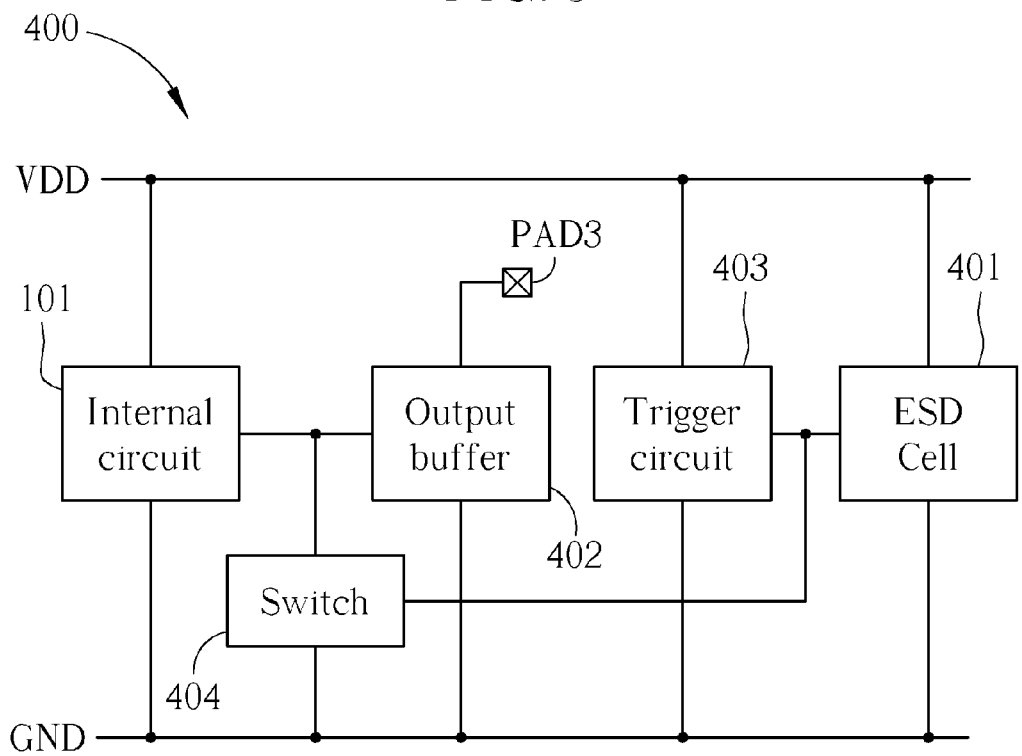
FIG. 10 illustrates a block diagram of an ESD protection device according to a third embodiment of the present invention.

In some embodiments of the present invention, the trigger circuit of the ESD protection device may already exist as a part of another circuit. FIG. 10 illustrates a block diagram of an ESD protection device 400 according to a third embodiment of the present invention. The ESD protection device 400 may be coupled to the internal circuit 101. The protection device 400 may comprise an output buffer 402, a trigger circuit 403, and a switch 404. The trigger circuit 403 may have a first terminal coupled to a power supply VDD, a second terminal coupled to a ground GND and an output terminal. The switch 404 may have a first terminal, a control terminal coupled to the output terminal of the trigger circuit 403, and a second terminal coupled to the ground GND. The output buffer 402 may have a first terminal coupled to an output pad PAD3, a control terminal coupled to the first terminal of the switch, and a second terminal coupled to the ground. When the output buffer 402 is an open-drain output buffer, the output buffer 402 may be a laterally diffused metal-oxide-semiconductor field effect transistor (LDMOS) N1 having a first terminal coupled to an output pad PAD3, a control terminal coupled to the first terminal of the switch, and a second terminal coupled to the ground. When the output buffer 402 is a normal output buffer, the output buffer 402 may comprise of a laterally diffused metal-oxide-semiconductor field effect transistor (LDMOS) N1 and a pull-high PMOS P1. The laterally diffused metal-oxide-semiconductor field effect transistor (LDMOS) N1 may have a first terminal coupled to an output pad PAD3, a control terminal coupled to the first terminal of the switch, and a second terminal coupled to the ground. The pull-high PMOS P1 may have a first terminal coupled to the power supply VDD, a second terminal coupled to the output pad PAD 3, and a control terminal coupled to the first terminal of the switch 404. The protection device 400 may further comprise an electrostatic discharge (ESD) cell 401. The ESD cell 401 may have a first terminal coupled to the power supply VDD, a control terminal coupled to the output terminal of the trigger circuit 403, and a second terminal coupled to the ground GND.

Figure 11:
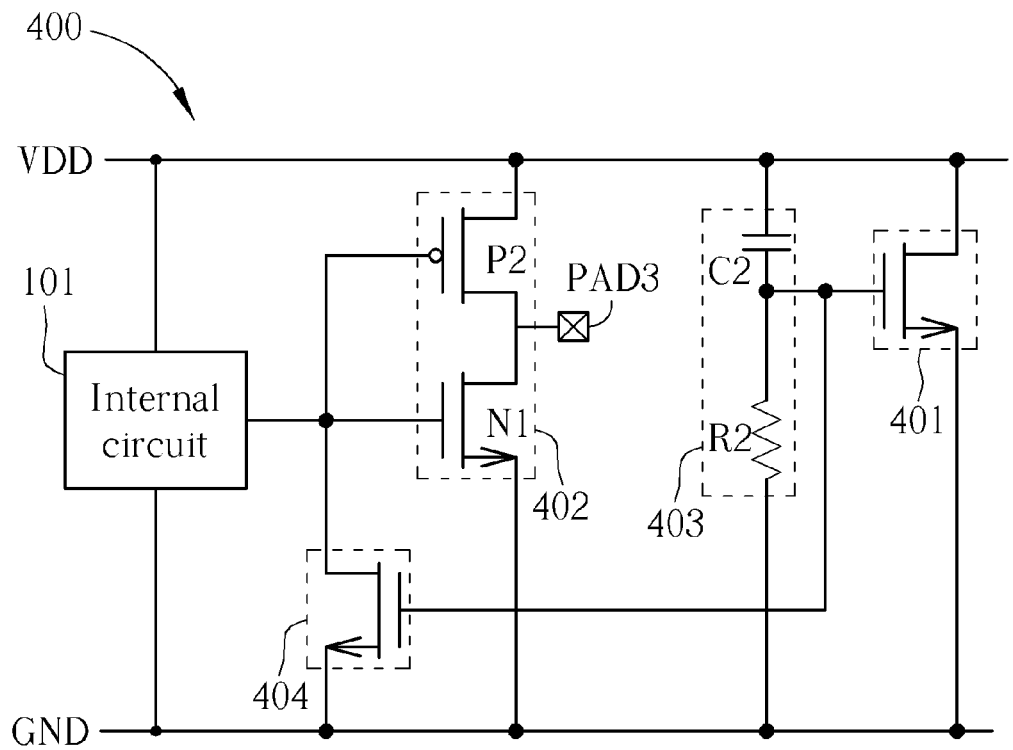
FIGS. 11 to 12 illustrate circuit diagrams of the ESD protection device in FIG. 10.
Figure 12:
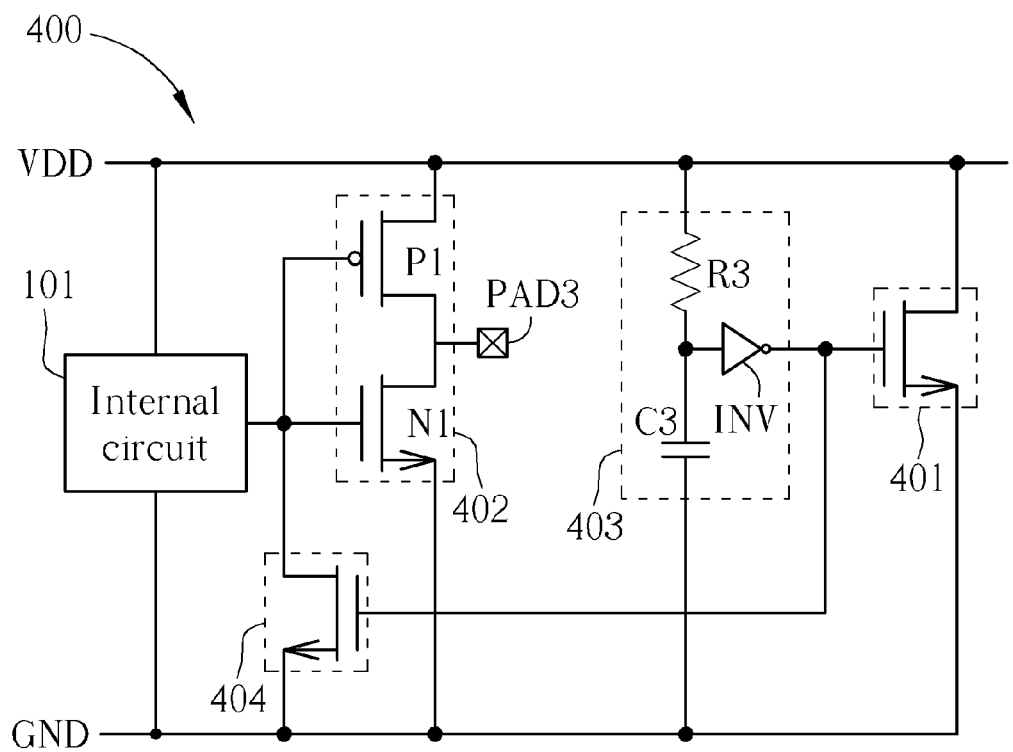

FIGS. 11 to 12 illustrate circuit diagrams of the ESD protection device 400 in FIG. 10. The ESD cell 401 may be a bipolar junction transistor (BJT), a silicon controlled rectifier (SCR), or a field effect transistor (FET). The switch 404 may be a metal-oxide-semiconductor field effect transistor (MOSFET). The output buffer 402 may be an open-drain output buffer or a normal output buffer. FIGS. 11 to 12 show embodiments of the ESD protection device 400 that may include a field effect transistor (FET) as the ESD cell 401, a metal-oxide-semiconductor field effect transistor (MOSFET) as the switch 404, and a normal output buffer as the output buffer 402. In FIG. 11, the trigger circuit 403 may comprise a capacitor C2 and a resistor R2. The capacitor C2 may have a first terminal coupled to the power supply VDD and a second terminal coupled to the control terminal of the switch 404. The resistor R2 may have a first terminal coupled to the second terminal of the capacitor C2 and a second terminal coupled to the ground GND. In FIG. 12, the trigger circuit 403 may comprise a capacitor C3, a resistor R3, and an inverter INV. The resistor R3 may have a first terminal coupled to the power supply VDD and a second terminal. The capacitor C3 may have a first terminal coupled to the second terminal of the resistor R3 and a second terminal coupled to the ground GND. The inverter INV may have a first terminal coupled to the second terminal of the resistor R3 and a second terminal coupled to the control terminal of the switch 404.

Figure 13:
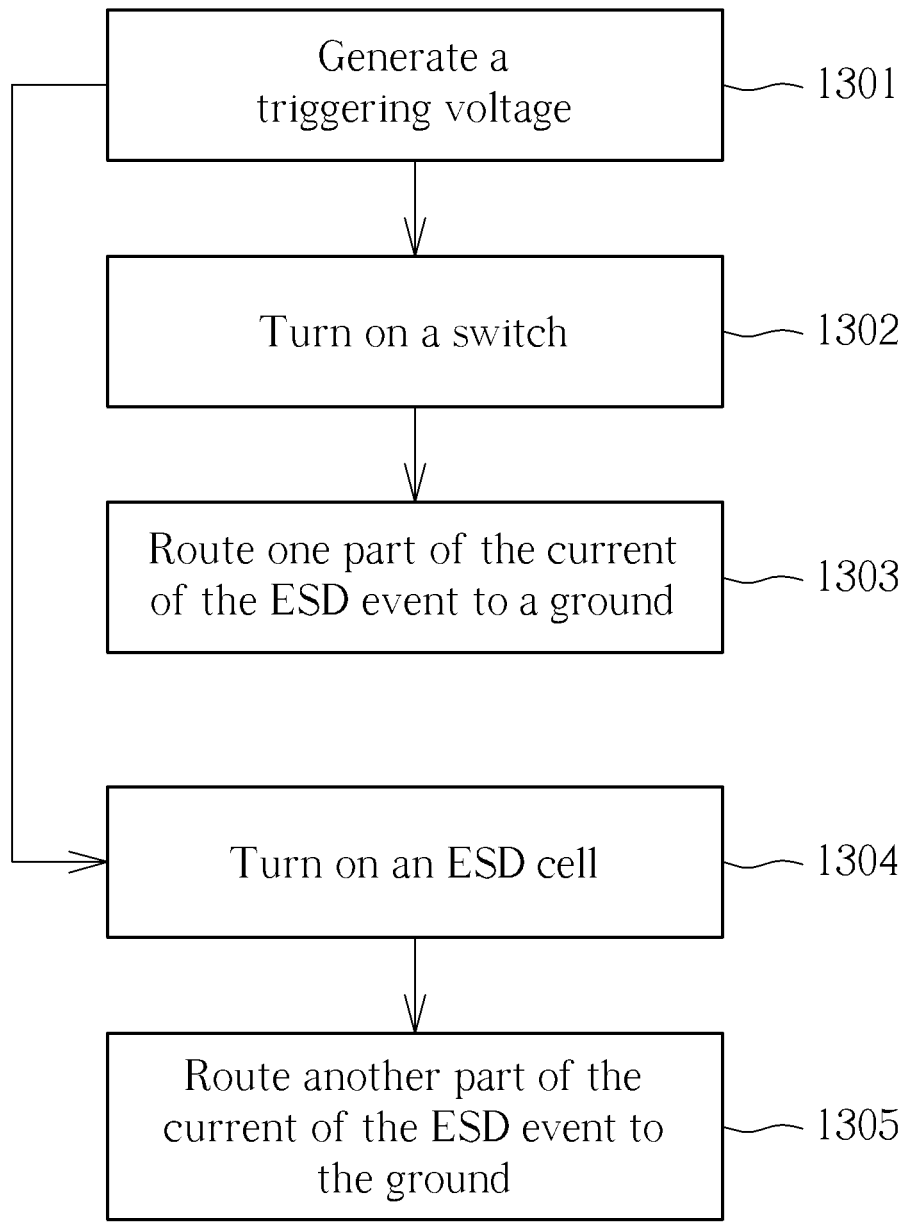
FIG. 13 illustrates a flowchart of a method of operation of an electrostatic discharge (ESD) protection device according to an embodiment of the present invention.

FIG. 13 illustrates a flowchart of a method of operation of an electrostatic discharge (ESD) protection device 200, 300, and 400 according to an embodiment of the present invention. The method of operation of the ESD protection device 200, 300, and 400 may include but is not limited to the following steps:

Step 1301: generate a triggering voltage according to an ESD event received from an output pad;

Step 1302: the triggering voltage turns on a switch coupled to the trigger circuit;

Step 1303: the ESD protection device routes one part of a current of the ESD event to a ground through the switch from an output buffer coupled to the output pad until the output buffer is completely turned off;

Step 1304: the ESD protection device turns on an ESD cell during the ESD event; and Step 1305: the ESD protection device routes the current of the ESD event to the ground through the ESD cell.

In step 1301, the trigger circuit may generate the triggering voltage according to the current of the ESD event received from the output pad. If the trigger circuit comprises a capacitor and a resistor as shown in FIGS. 3, 7, and 11, the current of the ESD event may charge the capacitor and generate the triggering voltage at the coupling between the capacitor and the resistor. If the trigger circuit comprises a diode and a resistor as shown in FIGS. 4 and 8 or a metal-oxide-semiconductor (MOS) diode and a resistor as shown in FIGS. 5 and 9, the current of the ESD event may deliver a charge to the diode or the metal-oxide-semiconductor (MOS) diode and upon reaching the breakover voltage of the diode or the metal-oxide-semiconductor (MOS) diode, a trigger voltage may be generated at the coupling between the diode or the metal-oxide-semiconductor (MOS) diode and the resistor.

In step 1302, the triggering voltage may turn on the switch coupled to the trigger circuit and the output pad. And in step 1303, one part of the current of the ESD event may be routed to the ground through the switch from the output buffer coupled to the output pad until the output buffer is completely turned off. Instead of the one part of the current of the ESD event going through the output buffer to the ground as disclosed in the prior art, the one part of the current of the ESD event is pulled from the first terminal of the output buffer to the first terminal of the switch through a gate to drain capacitance ($C_{GD}$) of the output buffer. Since the switch is turned on, the one part of the current of the ESD event may be used to pull the charge of the control terminal of the output buffer to the ground to completely turn off the output buffer. No current from the ESD event will go through the completely turned off output buffer. In doing so, all the current from the ESD event may then be pulled to the ground through the ESD cell to protect the output buffer from burnout.

In step 1304, in the embodiments shown in FIGS. 3 to 5, the ESD cell may be an active diode having a first terminal coupled to the output pad and a second terminal coupled to the ground. The ESD cell may be turned on during the ESD event. In the embodiments shown in FIGS. 7 to 9, the ESD cell may have a first terminal coupled to the output pad, a control terminal coupled to the trigger circuit, and a second terminal coupled to the ground. The ESD cell may be turned on when the triggering voltage is generated. In step 1305, the current of the ESD event may be routed to the ground through the ESD cell.

Note that the step 1302 and the step 1304 may be executed concurrently. The step 1302 may be followed by the step 1303 and the step 1304 may be followed by the step 1305.

In summary, an electrostatic discharge (ESD) protection device is presented that is able to route current of an ESD event away from an output buffer. The current of the ESD event is routed through a switch and into the ground. Therefore, the output buffer is completely protected during the ESD event.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrostatic discharge (ESD) protection device, comprising:
    a trigger circuit having a first terminal coupled to an output pad and a second terminal;
    a switch having a first terminal, a control terminal coupled to the second terminal of the trigger circuit, and a second terminal coupled to a ground; and
    an output buffer having a first terminal directly coupled to the output pad, a control terminal coupled to the first terminal of the switch, and a second terminal coupled to the ground.

2. The device in claim 1, further comprising:
    an electrostatic discharge (ESD) cell having a first terminal coupled to the output pad and a second terminal coupled to the ground.

3. The device in claim 2, wherein the electrostatic discharge (ESD) cell is a ground gate metal-oxide-semiconductor (GGMOS).

4. The device in claim 1, further comprising:
    an electrostatic discharge (ESD) cell having a first terminal coupled to the output pad, a control terminal coupled to the second terminal of the trigger circuit, and a second terminal coupled to the ground.

5. The device in claim 4, wherein the electrostatic discharge (ESD) cell is a bipolar junction transistor (BJT), a silicon controlled rectifier (SCR), or a field effect transistor (FET).

6. The device in claim 1, wherein the trigger circuit comprises:
    a capacitor having a first terminal coupled to the output pad and a second terminal coupled to the control terminal of the switch; and
    a resistor having a first terminal coupled to the second terminal of the capacitor and a second terminal coupled to the ground.

7. The device in claim 1, wherein the trigger circuit comprises:
    a diode having a first terminal coupled to the output pad and a second terminal coupled to the control terminal of the switch; and
    a resistor having a first terminal coupled to the second terminal of the diode and a second terminal coupled to the ground.

8. The device in claim 1, wherein the trigger circuit comprises:
    a metal-oxide-semiconductor (MOS) diode having a first terminal coupled to output pad and a second terminal coupled to the control terminal of the switch; and
    a resistor having a first terminal coupled to the second terminal of the metal-oxide-semiconductor (MOS) diode and a second terminal coupled to the ground.

9. The device in claim 1, wherein the switch is a metal-oxide-semiconductor field effect transistor (MOSFET).

10. The device in claim 1, wherein the output buffer is a laterally diffused metal-oxide-semiconductor field effect transistor (LDMOS).

11. An electrostatic discharge (ESD) protection device, comprising:
    a trigger circuit having a first terminal coupled to a power supply, a second terminal coupled to a ground and an output terminal;

a switch having a first terminal, a control terminal coupled to the output terminal of the trigger circuit, and a second terminal coupled to the ground; and an output buffer having a first terminal directly coupled to an output pad, a control terminal coupled to the first terminal of the switch, and a second terminal coupled to the ground.

12. The device in claim 11, wherein the trigger circuit comprises:
a capacitor having a first terminal coupled to the power supply and a second terminal coupled to the control terminal of the switch; and
a resistor having a first terminal coupled to the second terminal of the capacitor and a second terminal coupled to the ground.

13. The device in claim 11, wherein the trigger circuit comprises:
a resistor having a first terminal coupled to the power supply and a second terminal;
a capacitor having a first terminal coupled to the second terminal of the resistor and a second terminal coupled to the ground; and
an inverter having a first terminal coupled to the second terminal of the resistor and a second terminal coupled to the control terminal of the switch.

14. The device in claim 13, further comprising:
an electrostatic discharge (ESD) cell having a first terminal coupled to the power supply, a control terminal coupled to the output terminal of the trigger circuit, and a second terminal coupled to the ground.

15. The device in claim 14, wherein the electrostatic discharge (ESD) cell is a bipolar junction transistor (BJT), a silicon controlled rectifier (SCR), or a field effect transistor (FET).

16. The device in claim 11, wherein the switch is a metal-oxide-semiconductor field effect transistor (MOSFET).

17. The device in claim 11, wherein the output buffer is a laterally diffused metal-oxide-semiconductor field effect transistor (LDMOS).

18. A method of operation of an electrostatic discharge (ESD) protection device, comprising:
generating a triggering voltage according to an electrostatic discharge (ESD) event received from an output pad;
the triggering voltage turning on a switch coupled to the trigger circuit; and
routing one part of a current of the electrostatic discharge (ESD) event from a first terminal of an output buffer directly coupled to the output pad to a first terminal of the switch coupled to a control terminal of the output buffer and through to a second terminal of the switch coupled to the ground until the output buffer is turned off.

19. The method in claim 18, further comprising:
turning on an electrostatic discharge (ESD) cell having a first terminal coupled to the output pad and a second terminal coupled to the ground during the electrostatic discharge (ESD) event; and
routing the current of the electrostatic discharge (ESD) event to the ground through the electrostatic discharge (ESD) cell.

20. The method in claim 19, wherein the electrostatic discharge (ESD) cell is a ground gate metal-oxide-semiconductor (GGMOS).

21. The method in claim 18, further comprising:
turning on an electrostatic discharge (ESD) cell having a first terminal coupled to the output pad, a control terminal coupled to the trigger circuit, and a second terminal coupled to the ground when the triggering voltage is generated; and
routing the current of the electrostatic discharge (ESD) event to the ground through the electrostatic discharge (ESD) cell.

22. The method in claim 21, wherein the electrostatic discharge (ESD) cell is a bipolar junction transistor (BJT), a silicon controlled rectifier (SCR), or a field effect transistor (FET).

23. The method in claim 18, wherein the trigger circuit comprises:
a capacitor having a first terminal coupled to the output pad and a second terminal coupled to a control terminal of the switch; and
a resistor having a first terminal coupled to the second terminal of the capacitor and a second terminal coupled to a ground.

24. The method in claim 18, wherein the trigger circuit comprises:
a diode having a first terminal coupled to the output pad and a second terminal coupled to a control terminal of the switch; and
a resistor having a first terminal coupled to the second terminal of the capacitor and a second terminal coupled to a ground.

25. The method in claim 18, wherein the trigger circuit comprises:
a metal-oxide-semiconductor (MOS) diode having a first terminal coupled to the output pad and a second terminal coupled to a control terminal of the switch; and
a resistor having a first terminal coupled to the second terminal of the capacitor and a second terminal coupled to a ground.

26. The method in claim 18, wherein the switch is a metal-oxide-semiconductor field effect transistor (MOSFET) having a first terminal coupled to the output buffer, a control terminal coupled to the trigger circuit, and a second terminal coupled to the ground.

27. The method in claim 18, wherein the output buffer is a laterally diffused metal-oxide-semiconductor field effect transistor (LDMOS) having a first terminal coupled to the output pad, a control terminal coupled to the switch, and a second terminal coupled to the ground.

* * * * *